(12) United States Patent
Rother et al.

(10) Patent No.: US 8,655,069 B2
(45) Date of Patent: Feb. 18, 2014

(54) UPDATING IMAGE SEGMENTATION FOLLOWING USER INPUT

(75) Inventors: Carsten Curt Eckard Rother, Cambridge (GB); Toby Sharp, Cambridge (GB); Andrew Blake, Cambridge (GB); Vladimir Kolmogorov, Harrow (GB)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 12/718,343

(22) Filed: Mar. 5, 2010

(65) Prior Publication Data
US 2011/0216976 A1  Sep. 8, 2011

(51) Int. Cl.
*G06K 9/34* (2006.01)

(52) U.S. Cl.
USPC ............ 382/173; 382/159; 382/165; 382/181

(58) Field of Classification Search
USPC ................. 382/173, 159, 165, 181, 124, 106; 345/180, 179, 157
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,182,548 A * | 1/1993 | Haeberli | ........................ 345/639 |

(Continued)

FOREIGN PATENT DOCUMENTS

| CN | 201254344 | 6/2010 |
|---|---|---|
| EP | 0583061 | 2/1994 |

(Continued)

OTHER PUBLICATIONS

Carsten et al., "GrabCut"—Interactive Foreground Extraction using Iterated Graph Cuts, published on 2004, pp. 309-314, by ACM.*

(Continued)

*Primary Examiner* — Mekonen Bekele
(74) *Attorney, Agent, or Firm* — Pablo Tapia; Micky Minhas; Zete Law, P.L.L.C.

(57) ABSTRACT

Methods of updating image segmentation following user input are described. In an embodiment, the properties used in computing the different portions of the image are updated as a result of one or more user inputs. Image elements which have been identified by a user input are given more weight when updating the properties than other image elements which have already been assigned to a particular portion of the image. In another embodiment, an updated segmentation is post-processed such that only regions which are connected to an appropriate user input are updated.

20 Claims, 11 Drawing Sheets

(56) References Cited

U.S. PATENT DOCUMENTS

| | | |
|---|---|---|
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,900,953 A | 5/1999 | Bottou et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,151,025 A | 11/2000 | Yen et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,337,925 B1 | 1/2002 | Cohen et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,741,755 B1 * | 5/2004 | Blake et al. .................. 382/284 |
| 6,744,923 B1 * | 6/2004 | Zabih et al. .................. 382/226 |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,973,212 B2 | 12/2005 | Boykov et al. |
| 6,987,535 B1 | 1/2006 | Matsugu et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,079,992 B2 | 7/2006 | Greiffenhagen et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,430,339 B2 | 9/2008 | Rother et al. |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,589,721 B2 | 9/2009 | Lorenz |
| 7,590,262 B2 | 9/2009 | Fujimura et al. |
| 7,593,552 B2 | 9/2009 | Higaki et al. |
| 7,598,942 B2 | 10/2009 | Uderkoffler et al. |
| 7,606,417 B2 | 10/2009 | Steinberg et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,676,081 B2 * | 3/2010 | Blake et al. .................. 382/164 |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |

(56) References Cited

U.S. PATENT DOCUMENTS

| | | | |
|---|---|---|---|
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,720,283 B2 * | 5/2010 | Sun et al. | 382/173 |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,778,439 B2 | 8/2010 | Kondo et al. | |
| 7,809,167 B2 | 10/2010 | Bell | |
| 7,834,846 B1 | 11/2010 | Bell | |
| 7,852,262 B2 | 12/2010 | Namineni et al. | |
| 7,860,311 B2 | 12/2010 | Chen et al. | |
| RE42,256 E | 3/2011 | Edwards | |
| 7,898,522 B2 | 3/2011 | Hildreth et al. | |
| 8,004,536 B2 * | 8/2011 | Wilensky | 345/589 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,050,498 B2 * | 11/2011 | Wilensky et al. | 382/173 |
| 8,072,470 B2 | 12/2011 | Marks | |
| 8,081,822 B1 * | 12/2011 | Bell | 382/181 |
| 8,165,369 B2 | 4/2012 | Kubota et al. | |
| 8,170,350 B2 | 5/2012 | Steinberg et al. | |
| 8,306,333 B2 * | 11/2012 | Lai et al. | 382/190 |
| 8,463,051 B2 * | 6/2013 | Perronnin et al. | 382/224 |
| 2003/0184815 A1 | 10/2003 | Shiki et al. | |
| 2004/0202369 A1 | 10/2004 | Paragios | |
| 2005/0271273 A1 * | 12/2005 | Blake et al. | 382/173 |
| 2006/0039611 A1 * | 2/2006 | Rother et al. | 382/199 |
| 2006/0285747 A1 | 12/2006 | Blake et al. | |
| 2007/0081710 A1 | 4/2007 | Hong et al. | |
| 2007/0122039 A1 | 5/2007 | Zhang et al. | |
| 2007/0133880 A1 * | 6/2007 | Sun et al. | 382/195 |
| 2007/0165949 A1 | 7/2007 | Sinop et al. | |
| 2007/0211940 A1 | 9/2007 | Fluck et al. | |
| 2007/0216675 A1 * | 9/2007 | Sun et al. | 345/419 |
| 2007/0237393 A1 | 10/2007 | Zhang et al. | |
| 2007/0299667 A1 * | 12/2007 | Netsch et al. | 704/243 |
| 2008/0026838 A1 | 1/2008 | Dunstan et al. | |
| 2008/0120560 A1 | 5/2008 | Cohen et al. | |
| 2008/0136820 A1 | 6/2008 | Yang et al. | |
| 2008/0152231 A1 | 6/2008 | Gokturk et al. | |
| 2008/0260247 A1 | 10/2008 | Grady et al. | |
| 2008/0266432 A1 | 10/2008 | Tsuruoka | |
| 2008/0304698 A1 | 12/2008 | Rasmussen et al. | |
| 2008/0304735 A1 * | 12/2008 | Yang et al. | 382/164 |
| 2009/0033683 A1 | 2/2009 | Schiff et al. | |
| 2009/0060333 A1 | 3/2009 | Singaraju et al. | |
| 2009/0060334 A1 | 3/2009 | Rayner | |
| 2010/0104163 A1 | 4/2010 | Li et al. | |
| 2010/0266207 A1 * | 10/2010 | Zhang et al. | 382/195 |
| 2011/0117206 A1 * | 5/2011 | Holt et al. | 424/499 |

FOREIGN PATENT DOCUMENTS

| | | | |
|---|---|---|---|
| JP | 08044490 | 2/1996 | |
| WO | WO9310708 | 6/1993 | |
| WO | WO 9717598 | 5/1997 | |
| WO | WO9944698 | 9/1999 | |
| WO | WO 2008012808 | * 1/2008 | G06T 7/00 |
| WO | WO2008012808 A2 | 1/2008 | |
| WO | WO2009093146 A1 | 7/2009 | |
| WO | WO2009101577 A2 | 8/2009 | |

OTHER PUBLICATIONS

Jian et al., (hearrafter Jian), "Poisson Matting", published in 2004, p. 315-321, by ACM.*

Carsten et al., "GrabCut"—Interactive Foreground Extraction using Iterated Graph Cuts, published on 2004, pp. 309-314, ACM.*

Chunxia Xiao et al., Efficient Edit propagation using Hierarchical data structure, published Jan. 2007,in Journal of Latex class files vol. 6. No. 1 , p. 1-14.*

Adobe Photoshop, retrvied at <<http://www.adobe.com/support/photoshop/>> on Jul. 31, 2009, 7 pages.

An, AppProp: All-Pairs Appearance-Space Edit Propagation, retrieved at <<http://www.cs.dartmouth.edu/~fabio/papers/appprop08.ppt.pdf>> on Jul. 31, 2009, 36.

Bai et al., A Geodesic Framework for Fast Interactive Image and Video Segmentation and Matting, University of Minnesota, IEEE ICCV 2007, 8 pages.

Blake et al., "Interactive Image Segmentation using an adaptive GMMRF model", Microsoft Research Cambridge UK, May 2004, 14 pages.

Boykov et al., "An Experimental Comparison of Min-Cut/Max-Flow Algorithms for Energy Minimization in Vision", IEEE Transactions on PAMI, vol. 26, No. 9, Sep. 2007, pp. 1124-1137.

Boykov et al., "Interactive Graph Cuts for Optimal Boundary & Region Segmentation of Objects in N-D Images", International Conference on Computer Vision, Jul. 2001, vol. 1, pp. 105-pp. 112.

Chen et al., "Real-Time Edge-Aware Image Processing with the Bilateral Grid", SIGGRAPH '07, CSAIL-MIT, pp. 1-pp. 34.

Delong et al., "A Scalable Graph-Cut Algorithm for N-D Grids", IEEE Conference on Computer Vision and Pattern Recoginition (CVPR), Jun. 2008, pp. 1-pp. 8.

Olsen et al., "Edge-Respecting Brushes", Computer Science Department Brigham Young University, ACM, Oct. 19-22, 2008, pp. 171-pp. 180.

Grady, "Random Walks for Image Segmentation", IEEE Transactions on Pattern Analysis and Machine Intelligence, vol. 28, No. 11, Nov. 2006, pp. 1-pp. 17.

Kass et al., "Snakes: Active Contour Models", International Journal of Computer Vision, 1988, pp. 321-pp. 331.

Kopf et al., "Joint Bilateral Upsampling", retived at <<http://johanneskopf.de/publications/jbu/paper/FinalPaper_0185.pdf >>, on Jul. 31, 2009, 5 pages.

Levin et al., "A Closed-Form Solution to Natural Image Matting", School of Computer Science and Engineering, retrieved at <<http://www.wisdom.weizmann.ac.il/~levina/papers/Matting-Levin-Lischinski-Weiss-CVPR06.pdf>>, 8 pages.

Li et al., "Lazy Snapping", ACM Inc, 2004, 0730-0301/04.0800-0303, retirved at <<http://www.cse.ust.hk/~cktang/sample_pub/lazy_snapping.pdf>>,pp. 303-pp. 308.

Li et al., "Scribbleboost: Adding Classification to Edge-Aware Interpolation of Local Image and Video Adjustments", Eurographics Symposium on Rendering 2008, vol. 27, No. 4, pp. 1-pp. 10.

Lischinski et al., "Interactive Local Adjustment of Tonal Values", retrived at <<http://www.cs.huji.ac.il/~danix/itm/itm.pdf>> on Jul. 31, 2009.

Lombaert et al., "A Multilevel Banded Graph Cuts Method for Fast Image Segmentation", Tenth IEEE Internation Conference on Computer Vision, ICCV 2005, vol. 1, pp. 259-pp. 265.

Mortensen et al., "Intelligent Scissors for Image Composition", Brigham Young University, retrieved at <<http://web.engr.oregonstate.edu/~enm/publications/SIGGRAPH_95/scissors_comp.pdf>>, 1995, 8 pages.

Rother et al., "Grabcut—Interactive Foreground Extraction Using Iterated Graph Cuts", Microsoft Research Cambridge, AK, retrieved at <<http://research.microsoft.com/en-us/um/people/ablake/papers/ablake/siggraph04.pdf >>, Aug. 2004, pp. 1-6.

Wang et al., "An Iterative Optimization Approach for Unified Image Segmentation and Matting", retrived at <<http://research.microsoft.com/en-us/um/people/cohen/iccv2005.pdf >>, Oct. 2005, pp. 1-8.

Wang et al., "Soft Scissors: An Interactive Tool for Realtime High Quality Matting", retrieved at <<http://juew.org/publication/softscissors-SIG07.pdf>>on Jul. 31, 2009, 6 pages.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

(56) References Cited

OTHER PUBLICATIONS

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

"Interactive Simulation and Training", 1994, Division Incorporated, 6 pages.

Isard et al., "Condensation—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Virtual High Anxiety", Tech Update, Aug. 1995, pp. 22.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

Office action for U.S. Appl. No. 12/718,232, mailed on Jun. 22, 2012, Rother et al, "Up-Sampling Binary Images for Segmentation", 11 pages.

"3.18. Stroke Path". retrieved on Dec. 4, 2009 at <<http://docs.gimp.org/en/gimp-path-stroke.html>>, 2009, pp. 1-3.

Garain, et al., "On Foreground-Background Separation in Low Quality Color Document Images", retrieved on Dec. 3, 2009 at <<http://I3iexp.univ-lr.fr/madonne/publications/garain2005a.pdf>>, IEEE Computer Society, Proceedings of International Conference on Document Analysis and Recognition (ICDAR), 2005, pp. 585-589.

Hertzmann, "Stroke-Based Rendering", retrieved on Dec. 3, 2009 at <<http://www.dgp.toronto.edu/~hertzman/sbr02/hertzmann-sbr02.pdf>>, Recent Advances in NPR for Art and Visualization, SIGGRAPH, vol. 3, 2002, pp. 1-31.

Kang, et al., "A Unified Scheme for Adaptive Stroke-Based Rendering", retrieved on Dec. 3, 2009 at <<http://www.cs.umsl.edu/~kang/Papers/kang_tvc06.pdf>>, Springer Berlin, The Visual Computer, vol. 22, No. 9-11, Sep. 2006, pp. 814-824.

Kolmogorov, et al., "Applications of parametric maxflow in computer vision", IEEE International Conference on Computer Vision (ICCV), Rio de Janeiro, BR, Oct. 2007, pp. 1-8.

Lempitsky, et al., "Image Segmentation with a Bounding Box Prior", IEEE International Conference on Computer Vision (ICCV), Kyoto, JP, 2009, pp. 1-8.

Liu, et al., "Paint Selection", retrieved on Dec. 3, 2009 at <<http://yuwing.kaist.ac.kr/courses/CS770/reading/PaintSelection.pdf>>, ACM, Transactions on Graphics (TOG), vol. 28, No. 3, Article 69, Aug. 2009, pp. 1-7.

Lu, et al., "Dynamic Foreground/Background Extraction from Images and Videos using Random Patches", retrieved on Dec. 3, 2009 at <<http://books.nips.cc/papers/files/nips19/NIPS2006_0103.pdf>>, Conference on Neural Information Processing Systems (NIPS), 2006, pp. 351-358.

Mannan, "Interactive Image Segmentation", retrieved on Dec. 2, 2009 at <<http://www.c,s.mcgill.ca/~fmanna/ecse626/InteractiveImageSegmentation_Report.pdf>>, McGill University, Montreal, CA, Course ECSE-626: Statistical Computer Vision, 2009, pp. 1-5.

Mortensen, et al., "Intelligent Selection Tools", retrieved on Dec. 4, 2009 at <<http://web.engr.oregonstate.edu/~enm/publications/CVPR_00/demo.html>>, IEEE Proceedings of Conference on Computer Vision and Pattern Recognition (CVPR), Hilton Head Island, SC, vol. 2, 2000, pp. 776-777.

Protiere, et al., "Interactive Image Segmentation via Adaptive Weighted Distances", retrieved on Dec. 2, 2009 at <<http://citeseerx.ist.psu.edu/viewdoc/download?doi=10.1.1.97.776&rep=rep1&type=pdf>>, IEEE Proceedings of Conference on Computer Vision and Pattern Recognition (CVPR), New York, NY, Aug. 2006, pp. 160-167.

Tan, et al., "Selecting Objects With Freehand Sketches", retrieved on Dec. 3, 2009 at <<http://citeseerx.ist.psu.edu/viewdoc/download?doi=10.1.1.83.4105&rep=rep1&type=pdf>>, IEEE Proceedings of International Conference on Computer Vision (ICCV), Vancouver, CA, vol. 1, Jul. 2001, pp. 337-345.

Vicente, et al., "Joint optimization of segmentation and appearance models", IEEE International Conference on Computer Vision (ICCV), Kyoto, JP, Oct. 2009, pp. 1-8.

\* cited by examiner

UPDATING IMAGE SEGMENTATION FOLLOWING USER INPUT

BACKGROUND

A number of techniques have been proposed to enable extraction of the foreground from a scene, for example, the extraction of a person from a digital image showing the person standing in front of a scenic view. This process of splitting an image into the foreground and background is known as image segmentation. Image segmentation comprises labeling image elements (such as pixels, groups of pixels, voxels or groups of voxels) as either a foreground or a background image element. This is useful in digital photography, medical image analysis, and other application domains where it is helpful to find a boundary between an object in the image and a background. The extracted object and the background may then be processed separately, differently, etc. For example, in the case of a medical image it may be appropriate to segment out a region of an image depicting a tumor or organ such as the lungs in order to enable a surgeon to interpret the image data.

Dependent upon the technique used, the amount of user input that is involved to achieve the segmentation can vary significantly: from systems in which a user traces the approximate outline of the object to be extracted, to systems in which a user marks a rectangle on the image which contains the object. Some of these techniques allow a user to edit the initial segmentation that has been achieved, for example to correct for errors in the initial segmentation.

The embodiments described below are not limited to implementations which solve any or all of the disadvantages of known image segmentation techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of updating image segmentation following user input are described. In an embodiment, the properties used in computing the different portions of the image are updated as a result of one or more user inputs. Image elements which have been identified by a user input are given more weight when updating the properties than other image elements which have already been assigned to a particular portion of the image. In another embodiment, an updated segmentation is post-processed such that only regions which are connected to an appropriate user input are updated.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image labeling system for foreground/background image segmentation, the system described is provided as an example and not a limitation. As those skilled in the art will appreciate, the present examples are suitable for application in a variety of different types of image labeling systems and a non-exhaustive list of examples is: 3D reconstruction, stereo matching, object segmentation, object recognition and optical flow.

Figure 1:
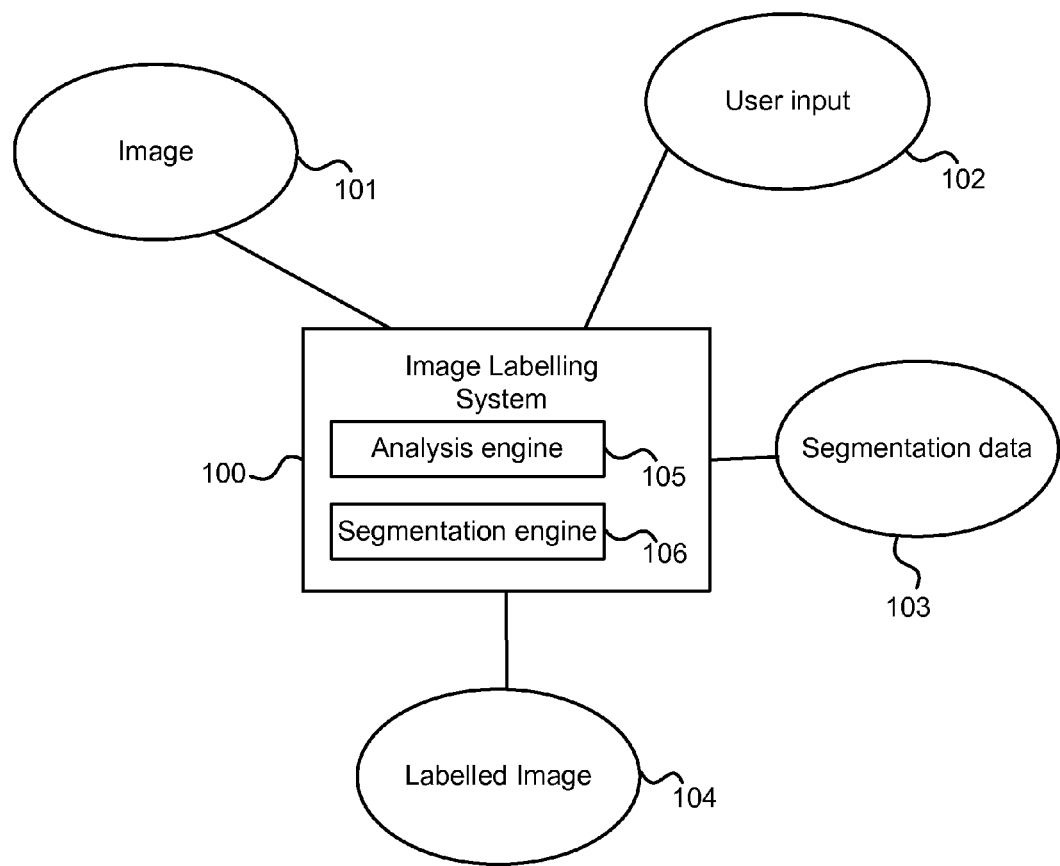
FIG. 1 is a schematic diagram of an image labeling system.

FIG. 1 is a schematic diagram of an image labeling system 100 implemented using a computer or processor of any suitable type. It is arranged to receive an image 101 as input and to provide as output a labeled version of that image 104 comprising, for each image element in the image or a part of the image, one of a specified plurality of possible labels. An image element may be a pixel, a group of pixels, a voxel or a group of voxels. The term "image" is used herein in a broad sense to include digital still images such as photographs, video stills, or other digital 2D images, medical images such as CT scans, MRI scans or other digital medical images, digital 3D images or higher dimensional images such as obtained from Z-cameras, voxel volumes, satellite imaging systems, ultra-sound scans, as well as sequences of images such as videos, or other captured or generated sequences of images.

The image labeling system receives user input 102 specifying "seeds", which may comprise brush strokes or other forms of marking parts of an image, for the labeling. In an example, these seeds identify one or more image elements as being part of a particular portion of the image. In the following description the user input is referred to as a brush stroke by way of example only and it will be appreciated that other types of user input which identifies one or more image elements (e.g. through marking a rectangle) may be used. The image labeling system also optionally receives segmentation data 103, which may comprise data labeling each image element in the image or a part of the image as foreground/background or may comprise properties associated with different portions of the segmented image. However, this segmentation data may be computed by the image labeling system itself.

The image labeling system 100 comprises an analysis engine 105 arranged to use the user input 102 and the segmentation data 103 to enable the segmentation of the image to be updated as described in more detail below. The image labeling system 100 may also comprise a segmentation engine 106 for performing image segmentation (which may involve optimizing energy functions, as described in more detail below) in order to generate the segmentation data 103.

A number of methods of improving image segmentation through user input are described below. The methods described may be used with any suitable method of performing the image segmentation and one example of a suitable method (referred to herein as 'GrabCut') is described in U.S. patent application Ser. No. 10/861,771 (Publication No. 2005/0271273) which is incorporated herein by reference in its entirety. A brief overview of an embodiment of GrabCut is provided below with reference to FIG. 2.

Figure 2:
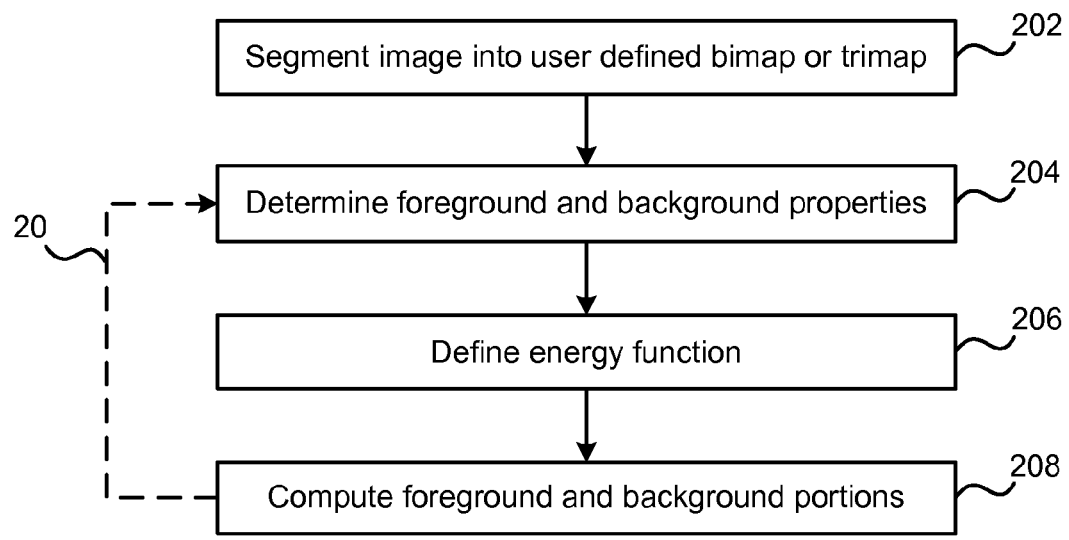
FIG. 2 is a flow diagram of an example method of image segmentation.

FIG. 2 is a flow diagram of an example method of image segmentation. This method uses graph cuts applied to a user defined bimap or trimap to segment an image into foreground and background regions. The image, which is considered to comprise pixels $z_n$ in color space, is segmented into a bimap or trimap based on user input (block 202). The user defines at least a background region ($T_B$) and may also specify an unknown region ($T_U$) and/or a foreground region ($T_F$). Where the user defines only the background region, the foreground region is set to be the empty set ($T_F = \emptyset$) and the unknown region is set to the complement of the background region $T_U = \overline{T_B}$). A parameter $\alpha_n$, which may be referred to as an opacity value, for each pixel is used to express the segmentation of the image and initially the opacity values are initialized as follows:

$\alpha_n = 0$ for $n \in T_B$ $\alpha_n = 1$ for $n \in T_U$

Gaussian mixture models (GMMs) may be used in defining the foreground and background properties (in block 204) and the foreground and background GMMs are initialized from sets $\alpha_n = 0$ and $\alpha_n = 1$ respectively. Each GMM (one for the background and one for the foreground) is taken to be a full-covariance Gaussian mixture with K components (e.g. K=5). A vector $k = (k_1, \ldots, k_n)$ is used, with $k_n \in \{1, \ldots, K\}$ to assign a unique GMM component (one component either from the background or the foreground model) to each pixel according to the opacity value $\alpha_n$. For each pixel in the unknown region (i.e. for each n in $T_U$) GMM components are assigned using:

$$k_n := \underset{k_n}{\mathrm{argmin}} D_n(\alpha_n, k_n, \theta, z_n) \quad (1)$$

And then the GMM parameters are learnt from the data z using:

$$\underline{\theta} := \underset{\underline{\theta}}{\mathrm{argmin}} U(\underline{\alpha}, k, \underline{\theta}, z) \quad (2)$$

The Gibbs energy for segmentation may be defined (in block 206) as:

$$E(\underline{\alpha}, k, \underline{\theta}, z) = U(\underline{\alpha}, k, \underline{\theta}, z) + V(\underline{\alpha}, z) \quad (3)$$

Where the parameter $\theta$ describes the image foreground and background distributions (as learned in block 204 using equation (2)), V is a smoothness term computed by Euclidean distance in color space, U evaluates the fit of opacity distribution $\alpha$ to the data z, given the parameter $\theta$ and taking account of the color GMM models, where:

$$U(\underline{\alpha}, k, \underline{\theta}, z) := \Sigma D_n(\alpha_n, k_n, \underline{\theta}, z_n) \quad (4)$$

Where:

$$D_n(\alpha_n, k_n, \underline{\theta}, z_n) = -\log p(z_n | \alpha_n, k_n, \underline{\theta}) - \log \pi(\alpha_n, k_n)$$

p( ) is a Gaussian probability distribution and π( ) are mixture weighting coefficients, so that (up to a constant):

$$D_n(\alpha_n, k_n, \underline{\theta}, z_n) = -\log \pi(\alpha_n, k_n) + \frac{1}{2} \log \det \sum (\alpha_n, k_n) + \frac{1}{2}[z_n - \mu(\alpha_n, k_n)]^T \sum (\alpha_n, k_n)^{-1}[z_n - \mu(\alpha_n, k_n)] \quad (5)$$

Therefore the parameters of the model are:

$$\underline{\theta} = \{\pi(\alpha, k), \mu(\alpha, k), \Sigma(\alpha, k), \alpha = 0, 1, k = 1 \ldots K\} \quad (6)$$

The smoothness term V is computed as follows, (where the contrast term is computed using Euclidean distance in the color space):

$$V(\underline{\alpha}, z) = \gamma \sum_{(m,n) \in C} [\alpha_n \neq \alpha_m] \exp -\beta \|z_m - z_n\|^2 \quad (7)$$

Where C is the set of pairs of neighboring pixels. When the constant $\beta = 0$, the smoothness term is simply the well-known Ising prior, encouraging smoothness everywhere, to a degree determined by the constant $\gamma$. In an implementation, $\beta$ may be greater than zero to relax the tendency to smoothness in regions of high contrast. The constant $\beta$ may be chosen as:

$$\frac{1}{\beta} = 2\langle(z_m - z_n)^2\rangle$$

Where < > denotes expectation over an image sample. In an implementation, such a choice of $\beta$ ensures that the exponential term in V (equation (7)) switches appropriately between high and low contrast.

Given the energy model described above, the foreground and background portions can be computed (in block 208) by using a standard minimum cut algorithm to solve:

$$\min_{\{\alpha_n : n \in T_U\}} \min_k E(\underline{\alpha}, k, \underline{\theta}, z) \quad (8)$$

All pixels in the trimap region $T_B$ are assigned to background and all pixels in $T_F$ to foreground. Pixels in $T_U$ are assigned to either foreground or background, depending on the result of the energy minimization (equation (8)).

The process may be repeated, as indicated by the dotted arrow 20, in an iterative minimization process (or other optimization process) until convergence. Further processing may then be used, such as border matting.

It will be appreciated that alternative segmentation methods may alternatively be used and GrabCut provides just one example of a suitable method. For example, where the image is monochrome (instead of color) the foreground and background properties may be defined in terms of histograms of gray values and a segmentation method such as that described in the paper 'Interactive graph cuts for optimal boundary and region segmentation of objects in N-D images' by Boykov and Jolley (published in Proc. IEEE International Conference on Computer Vision 2001) may be used.

Figure 3:
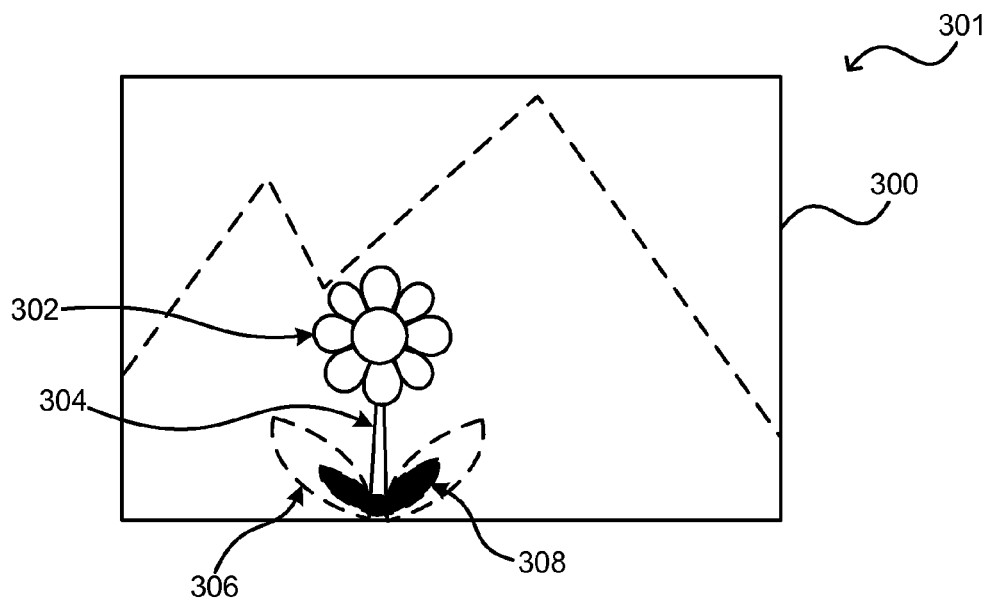
FIG. 3 shows simple graphical examples of user inputs.
Figure 3:
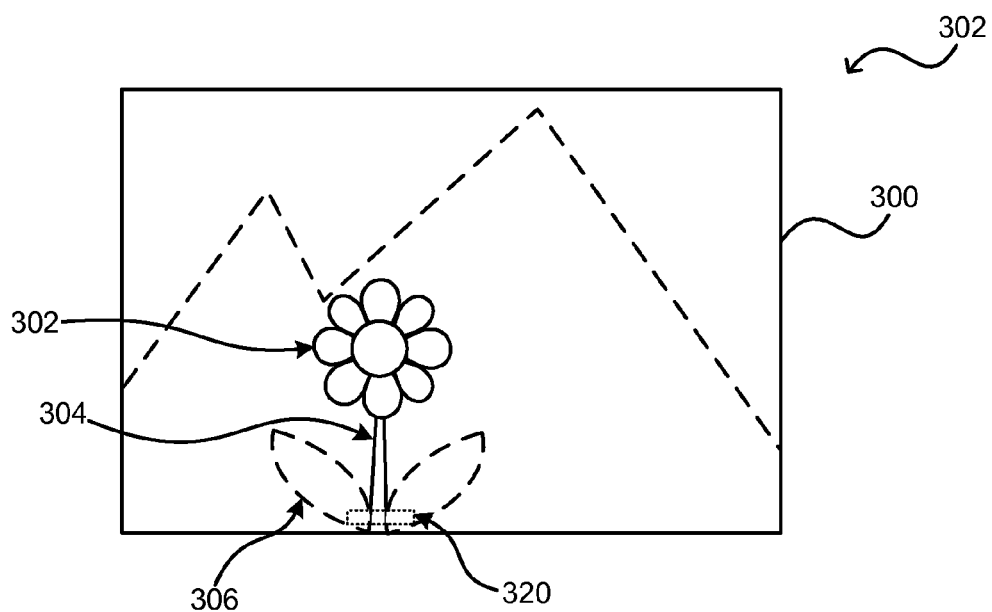

FIG. 3 shows simple graphical examples of user inputs which identify image elements within a segmented image. In FIG. 3 the current segmentation of an image 300 (performed using any suitable method, such as that described above with reference to FIG. 2) has identified a flower head 302 and stem 304 as foreground (as indicated by the solid lines in FIG. 3) but has not included the leaves 306 within the foreground (as indicated by the dotted lines in FIG. 3). In order to improve the segmentation results, a user may draw a brush stroke 308 over a portion of the missing foreground (e.g. user input 102 in FIG. 1), as shown in the first example 301. In another example, the user may mark (or draw) a shape 320 (e.g. a rectangle, square, circle or ellipse) on the image, as shown in the second example 302. In this example, the user input encompasses, and therefore identifies, image elements (e.g. pixels) which are currently background and image elements which are currently foreground; however, in other examples the user input may only identify image elements which are currently background. In the examples, the brush stroke identifies those image elements which are co-located with the brush stroke and the shape identifies those image elements which are within the outline drawn. The brush stroke 308 or shape 320 may be defined by a user using any suitable user input device, such as a mouse, stylus, touch sensitive display etc.

The examples shown in FIG. 3 identify image elements as belonging to the foreground portion of the image 300. However, it will be appreciated that in other examples user inputs may identify image elements as belonging to the background portion of the image and embodiments of the methods described herein may use any combination of foreground and/or background inputs.

Figure 4:
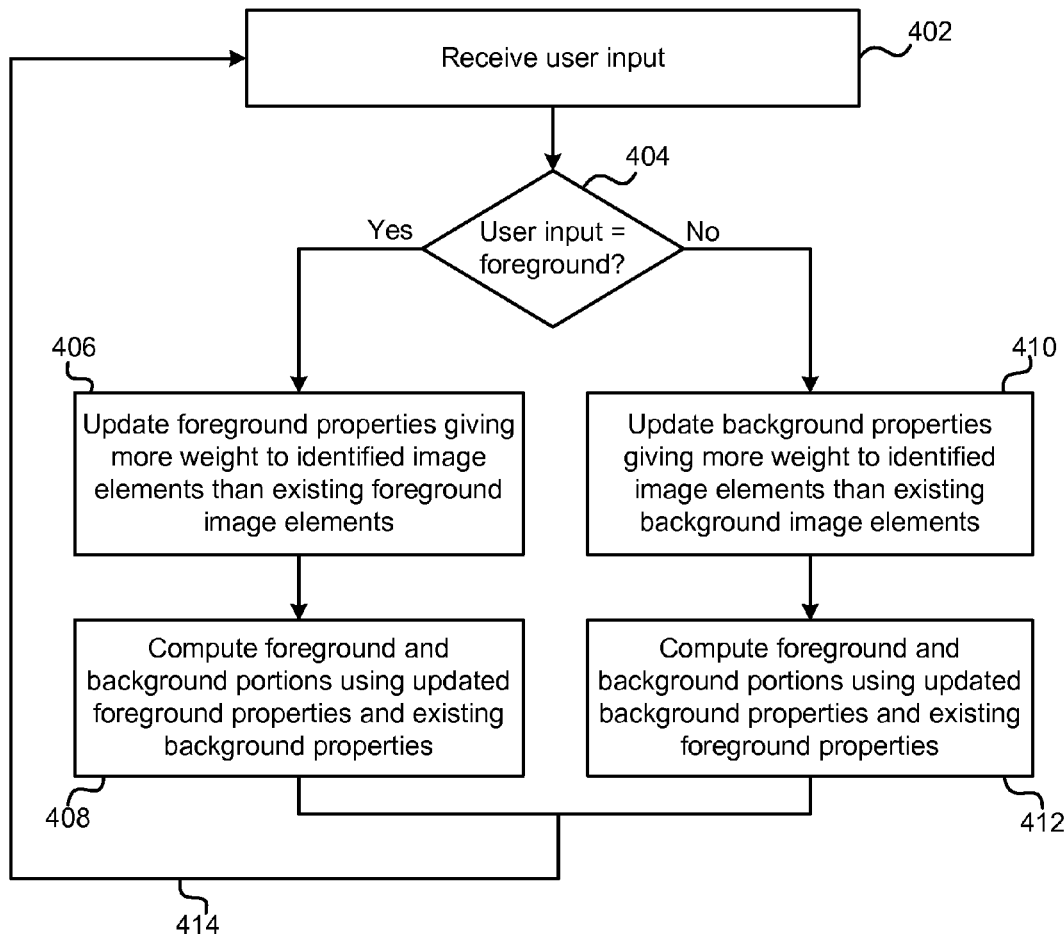
FIG. 4 is a flow diagram of an example method of updating an image segmentation based on user input.

FIG. 4 is a flow diagram of an example method of updating an image segmentation based on user input, such as user-defined brush stroke 308 or user-defined shape 320 in FIG. 3. This user input may be received in response to displaying segmentation results to the user. In the method shown in FIG. 4, the image segmentation is updated following a single user input or following each individual user input, where the user input identifies one or more image elements (e.g. pixels) as being part of a particular portion of the image (e.g. background or foreground).

On receipt of a user input identifying one or more image elements (in block 402), it is determined from the user input, whether the user input identifies one or more image elements as being part of the foreground or part of the background portions of the image (block 404). If the user input is determined to be a foreground input, i.e. identifying (or marking) one or more image elements as belonging to a foreground portion ('Yes' in block 404, and as shown in the example of FIG. 3), the foreground properties (e.g. the foreground properties determined in performing the current segmentation) are updated giving more weight to those image elements (e.g. pixels) that have been identified (e.g. brushed by a brush stroke user input) than to those image elements which are labeled as foreground in the current segmentation but have not been identified by the user input (block 406, e.g. as performed by analysis engine 105 in FIG. 1). These updated properties are then used, in combination with the existing background properties (as calculated in performing the current segmentation process) to update the segmentation (in block 408, e.g. as performed by the segmentation engine 106 in FIG. 1).

The term 'current segmentation' is used herein to refer to the segmentation before it is updated in block 408 or block 412 and which may, in the case of the first user input received, be the initial segmentation (i.e. the segmentation performed before receipt of any of these user inputs updating the segmentation). The user input(s) may be received in response to displaying the results of this current segmentation to the user e.g. the foreground or the background portions may be displayed to the user or the two portions may be displayed as different layers within an image editing application or tool.

In an example, the foreground properties may be updated using a weighted combination of properties of the image elements within the foreground. Different weights are applied to the properties of image elements which have been identified and to the properties of other image elements within the foreground (which have not been identified by a user input). The weight applied to the identified image elements is larger (and in some examples, significantly larger) than the weight applied to the other foreground elements. In the situation where the identified image elements only comprise background image elements, the 'other image elements within the foreground' comprise all the image elements labeled as foreground in the current segmentation. A method of updating the foreground properties (block 406) is described in more detail below using the GrabCut notation by way of example.

In a corresponding manner, if the user input is determined to be a background input, i.e. identifying (or marking) one or more image elements as belonging to a background portion ('No' in block 404), the background properties (e.g. the background properties determined in performing the current segmentation) are updated giving more weight to those image elements that have been identified by the user input than to those image elements which are labeled as background in the current segmentation but have not been identified (block 410, e.g. as performed by analysis engine 105 in FIG. 1). These updated properties are then used, in combination with the existing foreground properties (as calculated in performing the current segmentation process) to update the segmentation (in block 412, e.g. as performed by the segmentation engine 106 in FIG. 1).

Having updated the segmentation, in block 408 or 412, the updated segmentation results may be displayed to the user via a display device (not shown in FIG. 4), e.g. the foreground or the background portions may be displayed to the user or the two portions may be displayed as different layers within an image editing application or tool. The method may be repeated following receipt of another user input (as indicated by arrow 414) or using data relating to another user input (or group of user inputs, as described in more detail below).

Figure 10:
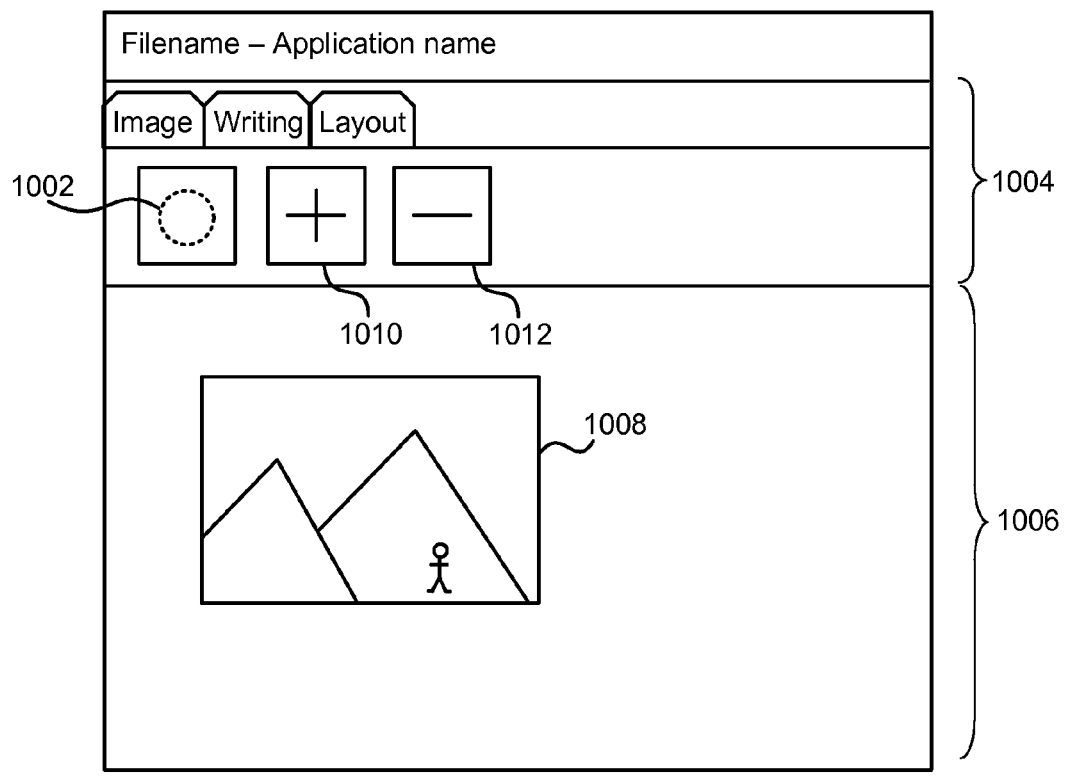
FIG. 10 is a schematic diagram of a user interface for performing image segmentation.

The determination as to whether the user input identifies image elements as belonging to the background or foreground, i.e. whether the input is a foreground or background input, (in block 404) may be made in many different ways. For example the user may click on an icon labeled 'Background' or 'Foreground' before marking the image (e.g. before placing the brush stroke) or the user may depress a different control (e.g. a keyboard key or mouse button) whilst making the mark on the image (e.g. whilst making the brush stroke). It will be appreciated that these are provided by way of example only and where icons are used they may be labeled in a different manner (e.g. '+' for foreground and '−' for background as shown in the example of FIG. 10 described below).

Figure 5:
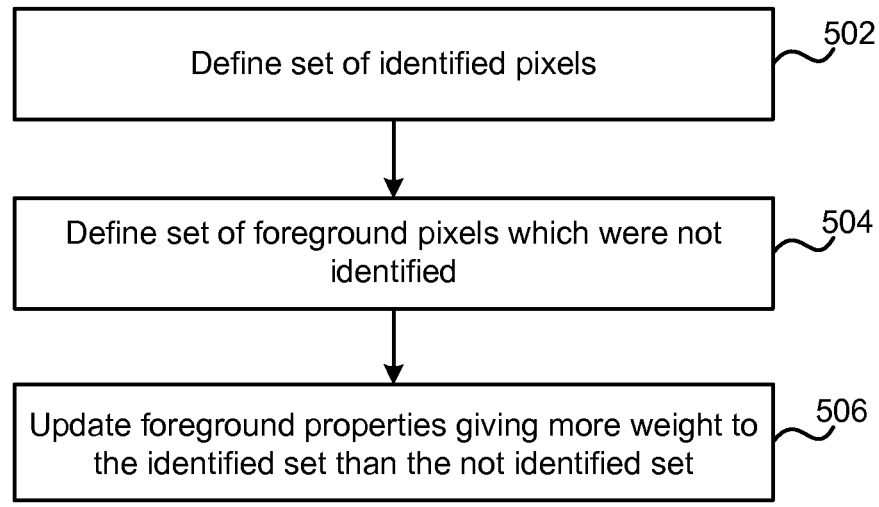
FIG. 5 is a flow diagram of an example method of updating of the foreground properties.

FIG. 5 is a flow diagram of an example method of updating of the foreground properties (in block 406 in FIG. 4). Two sets of image elements indices (e.g. pixels indices) are defined (in blocks 502 and 504) which may be referred to as FnotBrush (k) and FBrush(k). FnotBrush(k), as defined in block 504, is the set of image elements indices (e.g. pixels indices) which are not identified (e.g. brushed) by the foreground input (e.g. a foreground brush), are allocated to the foreground in the current segmentation ($\alpha=1$) and are assigned to the Gaussian with index k. This can be written as:

$F\text{notBrush}(k) = \{n : k_n = k \text{ and } \alpha_n = 1, \text{ and not identified by a foreground input}\}$ FBrush(k), as defined in block 502, is the set of image elements indices (e.g. pixels indices) which are identified by the foreground input and are assigned to the Gaussian with index k. This can be written as:

$F\text{Brush}(k) = \{n : k_n = k \text{ and identified by a foreground input}\}$ Having defined the two sets (in blocks 502 and 504), the foreground properties are updated giving more weight to the pixels in the set FBrush(k) than to the pixels in the set FnotBrush(k) (block 506), using a weighted combination (e.g. a weighted average) of parameters. Where the segmentation uses GMM as the foreground and background properties (as in GrabCut described above) and the image element is a pixel, parameters, such as the mean, $\mu$, and the covariance, $\Sigma$, of the foreground GMM may be updated as follows. Here we consider for example $\mu(1,k)$, using the notation as before, which means the mean of $k^{th}$ Gaussian of the foreground model:

$\mu(1,k) = 1/Z * \Sigma_n [w(\text{Brush}) * z_n * \sigma[n \text{ is in the set } F\text{Brush}(k)] + w(\text{notBrush}) * z_n * \sigma[n \text{ is in the set } F\text{notBrush}(k)]$ where w(Brush) and w(notBrush) are two weights and σ[argument] is '1' if "argument" is true and '0' if not. The value Z is a normalization constant and can be computed as:

$Z = \Sigma_n [w(\text{Brush}) * \sigma[n \text{ is in the set } F\text{Brush}(k)] + w(\text{notBrush}) * \sigma[n \text{ is in the set } F\text{notBrush}(k)]$ The mixing weighting $\pi(\alpha,k)$ for each Gaussian is also updated. Note that for both $\alpha=1$ and $\alpha=0$ it is $\Sigma_k \pi(\alpha,k)=1$. The update is done in the following way:

$\pi(1,k) = 1/Z_2 \Sigma_n [w(\text{Brush}) * \sigma[n \text{ is in the set } F\text{Brush}(k)] + w(\text{notBrush}) * \sigma[n \text{ is in the set } F\text{notBrush}(k)]$ where:
$Z_2 = \Sigma_n w(\text{Brush}) * \sigma[n \text{ is in a set FBrushSuper}] + w(\text{notBrush}) * \sigma[n \text{ is in the set FnotBrushSuper}]$ In the above equation, FBrushSuper is a superset, i.e. a merging of all sets FBrush(k) with k=1, ..., K; and FnotBrushSuper is also superset, i.e. a merging of all sets FnotBrush(k) with k=1, ..., K. In the same way $\pi(0,k)$ is computed. The covariance matrix $\Sigma(\alpha,k)$ is as above weighted depending on the respective pixel being part of FBrush(k)] or FnotBrush(k (here $\alpha=1$). If data with 3-dimensions is used (e.g. RGB) then is a 3×3 matrix. An entry for $\Sigma(1,k)$ is then:

$\Sigma_{ij} = 1/Z_3 * \Sigma_n [w(\text{Brush}) * (z_{n,i} - \mu_i) * (z_{n,j} - \mu_j) * \sigma[n \text{ is in the set } F\text{Brush}(k)] + w(\text{notBrush}) * (z_{n,i} - \mu_i) * (z_{n,j} - \mu_j) * \sigma[n \text{ is in the set } F\text{notBrush}(k)]$ where $\mu_i$ is the $i^{th}$ dimension of $\mu(1,k)$; $z_{n,i}$ is the $i^{th}$ dimension of input data. The normalization constant $Z_3$ is then the same as Z. This means:

$Z_3 = \Sigma_n [w(\text{Brush}) * \sigma[n \text{ is in the set } F\text{Brush}(k)] + w(\text{notBrush}) * \sigma[n \text{ is in the set } F\text{notBrush}(k)]$ The values of the two weights, w(Brush) and w(notBrush), which are used in relation to sets FBrush(k) and FnotBrush(k) respectively, may be set to any value such that w(Brush) is larger than w(notBrush). In an example, w(Brush)=80 and w(notBrush)=1. These weights may be user defined, defined by the image labeling system or fixed in value.

It will be appreciated that the method shown in FIG. 5 may alternatively be used for background image elements, with sets of background image elements (e.g. pixels) defined in block 504, e.g.:

$B\text{notBrush}(k) = \{n : k_n = k \text{ and } \alpha_n = 0, \text{ and not identified by a background input}\}$ $B\text{Brush}(k) = \{n : k_n = k \text{ and identified by a background input}\}$ Based on these defined sets, the background properties are updated in block 506.

Where the image segmentation is performed using Grab-Cut, the computing of the foreground and background portions (in blocks 408 and 412) using the updated properties can be performed by using a standard minimum cut algorithm to solve equation (8) above.

The method shown in FIG. 4 updates the image segmentation following a user input (e.g. a single brush stroke) or may be repeated following each of a number of user inputs (e.g. following each brush stroke defined by a user). In another embodiment, shown in FIG. 6, the image segmentation may be updated following a plurality of user inputs. The plurality of user inputs (e.g. a plurality of brush strokes) may comprise only background inputs (e.g. only background brushes), only foreground inputs (e.g. only foreground brushes) or may comprise a combination of one or more foreground inputs and one or more background inputs (e.g. a combination of background and foreground brushes).

Following receipt of a plurality of user inputs (block 602), the foreground properties (e.g. the foreground GMM) are updated based on one or more the foreground inputs in the plurality of user inputs (block 604). This updating of properties may be performed as described above and shown in FIG. 5. The background properties are updated similarly based on one or more of the background inputs in the plurality of user inputs (block 606) and again this may be performed as shown in FIG. 5. The image segmentation is then updated (i.e. the foreground and background portions of the image are computed) using the updated properties (block 608). The results of the updated image segmentation may then be displayed to a user via a display device (not shown in FIG. 6), e.g. by displaying the image with the foreground portion highlighted or by displaying only the foreground portion.

Where the user input (received in block 602) only defines foreground inputs, there will be no data upon which to update the background properties (in block 606) and in this situation the existing background properties are used in updating the image segmentation (in block 608). Similarly, where the user input only defines background inputs, there will be no data upon which to update the foreground properties (in block 604) and the existing foreground properties are used in computing the foreground and background portions (in block 608). In another embodiment, however, alternative distributions may be used where there are no updated properties for either the background or the foreground. In an example, where the user input (received in block 602) defines only foreground inputs, the foreground and background portions may be computed (in block 608) using the updated foreground properties and a uniform distribution for the background.

Figure 6:
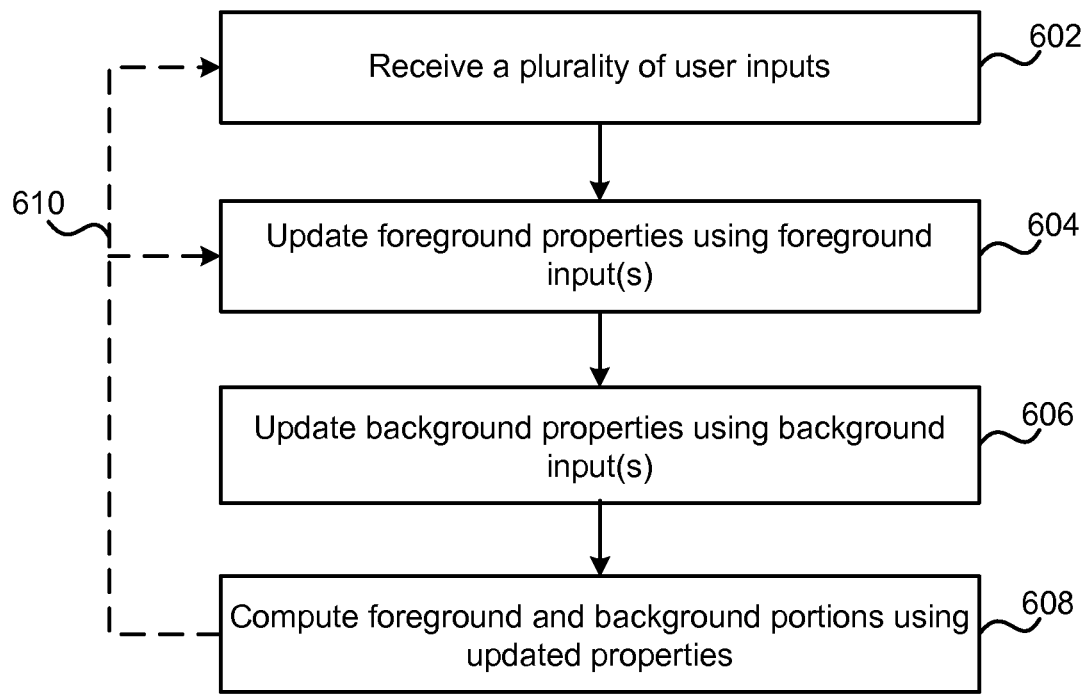
FIG. 6 is a flow diagram of another example method of updating an image segmentation based on user input.

The method shown in FIG. 6 and described above may, for example, be applied once based on all the user's inputs. In another example, the method may be applied for a first group of inputs and repeated for a second group of inputs (as indicated by dotted arrow 610). In such an embodiment, the groups of inputs may be defined according to the order in which the input is defined by the user (e.g. $1^{st}$ 5 inputs, next 5 inputs etc) or the groups may be defined in another manner (e.g. first group of connected inputs, second group of connected inputs etc). Each group may comprise one or more inputs.

Figure 9:
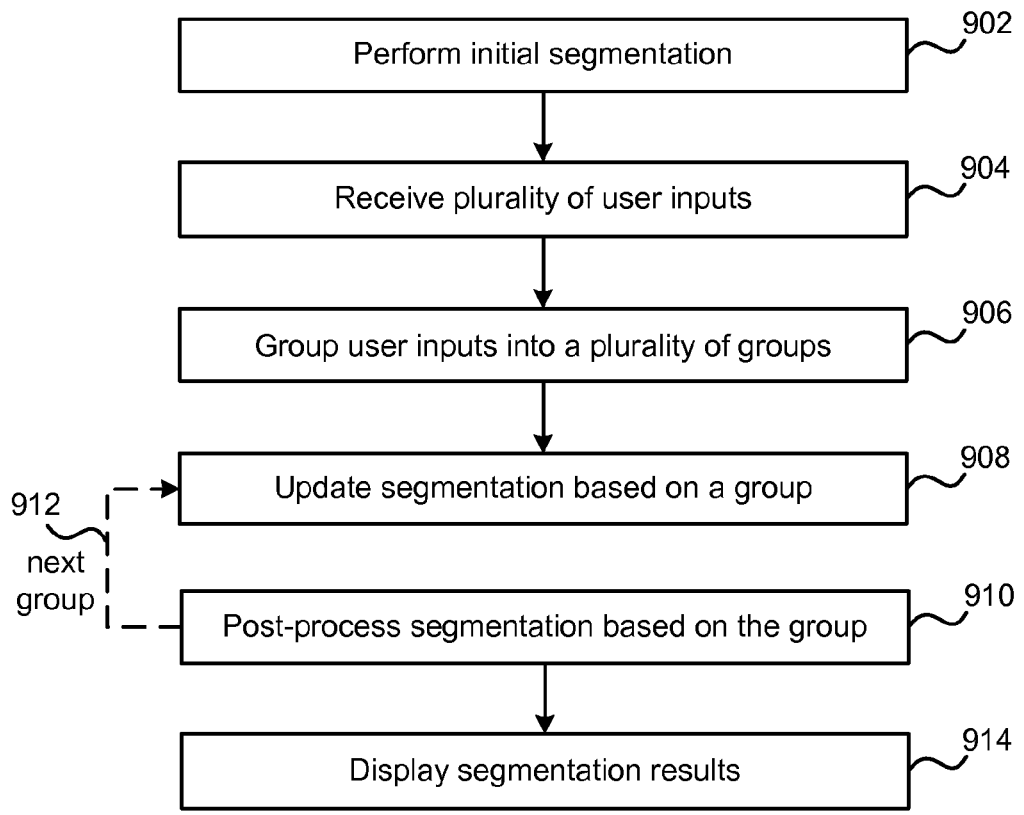
FIG. 9 is a flow diagram of another example method of post-processing an image segmentation which has already been updated based on user input.

Each group of inputs may be received separately (in block 602) or each group may comprise a subset of the inputs received (in block 602). The method shown in FIG. 6 may further comprise grouping the user inputs (not shown in FIG. 6) having received the user input (in block 602) and before updating the foreground and background properties (in blocks 604 and 606), e.g. as shown in FIG. 9 which is described below. The grouping of the user inputs (e.g. brush strokes) may be performed by the analysis engine 105 in FIG. 1. In one example, those brushes which are physically close together in the image may be grouped together and in another example, those brushes which have similar colors may be grouped together.

As described above, the methods give more weight to image elements identified by a user input (e.g. brushed image elements) compared to image elements which, according to the current segmentation, have already be labeled as belonging to the particular portion of the image (e.g. foreground/background) when re-computing the image segmentation. This may provide a better quality of image segmentation and/or improve the user experience.

Figure 7:
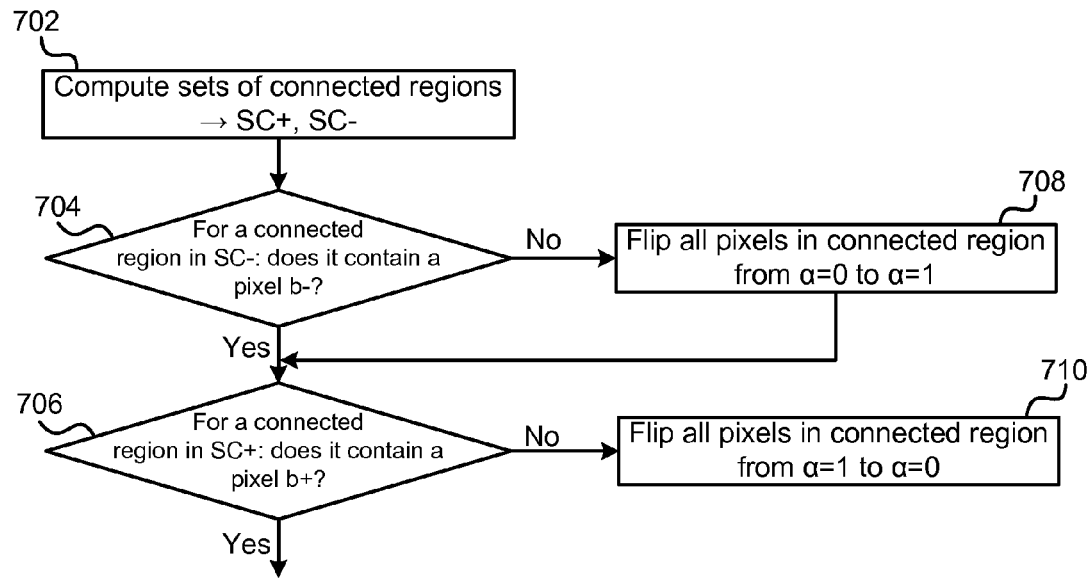
FIG. 7 is a flow diagram of an example method of post-processing an image segmentation which has already been updated based on user input.

FIG. 7 is a flow diagram of an example method of post-processing an image segmentation which has been updated based on user input (e.g. user-defined brush strokes). This method checks whether a region of the image which has changed from background to foreground as a result of the user input is connected to a foreground user input. If the changed region is unconnected, the region is changed back to background. Similarly, the method checks whether a region of the image which has changed from foreground to background as a result of the user input is connected to a background input. If the changed region is unconnected, the region is changed back to foreground. This reduces unexpected changes in image segmentation, improving the quality of the resultant segmentation and the user experience.

The method shown in FIG. 7 and described in more detail below may be performed each time a segmentation is achieved or may be performed on a subset of occasions. In FIG. 7 pixels are used as examples of image elements and it will be appreciated that other image elements may alternatively be used.

The input data for the method of FIG. 7. comprises: a segmentation $S_0$ before a user input (e.g. one or more user brush strokes) is applied, a segmentation $S_1$ after updating based on the user input and data relating to the user input (e.g. the user-defined brush strokes). As described above with reference to other methods, brush strokes provide one example of a user input and other examples, such as shapes, may be used. The user input may be received following display of the segmentation $S_0$ to the user.

The data relating to the user input may be defined in terms of two sets: a set (b−) of image elements (e.g. pixels) which have been identified by a background input (e.g. brushed by a background brush) and hence have been forced to take the background label ($\alpha=0$), and a set (b+) of image elements (e.g. pixels) which have been identified by a foreground input (e.g. brushed by a foreground brush) and hence have been forced to take the foreground label ($\alpha=1$). It will be appreciated that in some examples, only one set may be defined or one or both of the sets may be an empty set.

The method shown in FIG. 7 may be used in combination with the methods described previously and shown in FIGS. 4-6 and these methods may be used to generate segmentation $S_1$. Alternatively, the method shown in FIG. 7 may be used with another method of updating an image segmentation as a result of user input.

The method of FIG. 7 uses the principle of connectivity of image elements. In an example, this may be defined as follows: given a 4-connected graph on the image element (e.g. pixel) grid (in which each image element has four neighbors: up, down, left, right), two image elements are connected if there exists a path in the graph which connects the two image elements. In other examples, different measures of connectivity may be used, such as an 8-connected graph or higher connected graph.

The method of FIG. 7 comprises computing two sets of connected regions, SC+ and SC− (block 702, e.g. using analysis engine 105 in FIG. 1). The set SC− is defined as each connected component which has image elements which are foreground ($\alpha=1$) in $S_0$ and background ($\alpha=0$) in $S_1$. The set SC+ is defined as each connected component which has image elements which have changed from background ($\alpha=0$) in $S_0$ to foreground ($\alpha=1$) in $S_1$. Standard connected component analysis techniques may be used to compute the two sets SC+ and SC−. In some examples, only one set may be defined or one or both of the sets may be an empty set.

Having computed the sets (in block 702), a connected region in a set (e.g. in set SC− or SC+) is then examined (in block 704 or 706). If a connected region in SC− is identified (in block 704) which does not contain an image element which has been identified by a background input (i.e. an image element which is a member of set b−), the image elements within the particular region being examined are changed back to foreground (block 708). If a connected region in SC+ is identified (in block 706) which does not contain an image element which has been identified by a foreground input (i.e. an image element which is a member of set b+), the image elements in the particular region being examined are changed back to background (block 710). In an embodiment, each of the regions in the sets of connected regions (as computed in block 702) may be examined (in block 704 or 706 as appropriate); however in other embodiments a subset of the regions may be examined.

Figure 8:
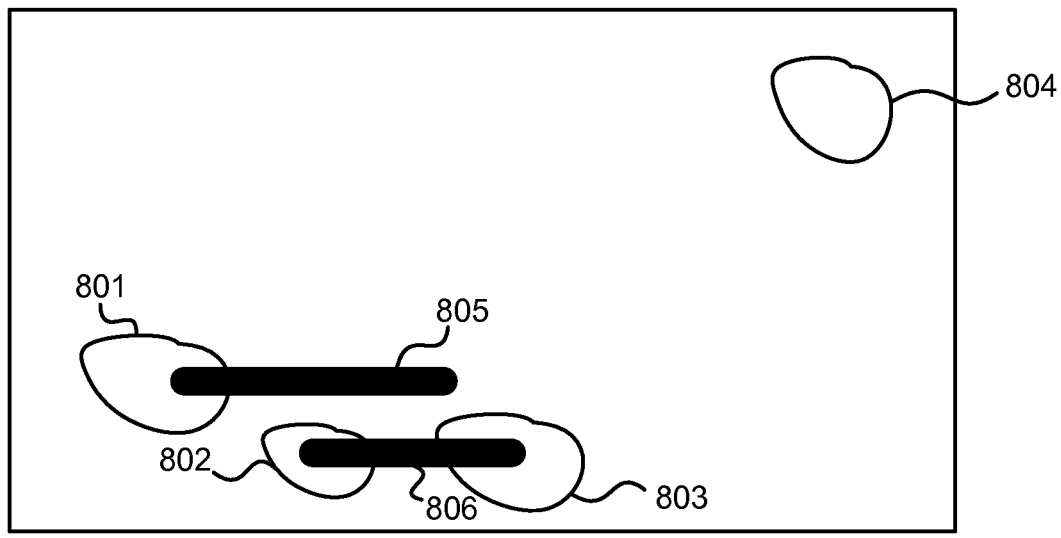
FIG. 8 is a graphical representation of the method of FIG. 7.

The method can be further described with reference to the graphical representation of FIG. 8 which uses user-defined brush strokes as an example of a user input. FIG. 8 shows four regions 801-804 and two brush strokes 805-806. The regions 801-804 are regions (computed in block 702) which have changed from a first label (e.g. foreground) to a second label (e.g. background) when the segmentation was updated based on the user input (e.g. in going from $S_0$ to $S_1$). All these regions therefore belong to the same set (e.g. SC−). The brush strokes 805-806 are user inputs marking image elements as having the second label (e.g. background brush strokes, with the marked image elements being members of set b−). The analysis of block 704 can then be performed. The first connected region 801 does contain an image element in b− (the region overlaps with brush stroke 805) and therefore the image elements within the region keep the second label. The same is true for regions 802 and 803 as each region overlaps with brush stroke 806. Region 804, however, does not overlap with either brush stroke and therefore the region does not contain an image element in set b− ('No' in block 704 of FIG. 7) and as a result the image elements within that region revert back to their previous labeling of the first label (block 708 in FIG. 7).

In an embodiment of the method shown in FIG. 7, the segmentation $S_0$ is the segmentation before any user inputs updating the segmentation have been placed (e.g. user inputs as shown in FIG. 3), i.e. the output from the initial segmentation process. The initial segmentation process may, for example, use the method shown in FIG. 2 and described above. It will be appreciated that this initial segmentation may require some user input, e.g. placement of a user-specified bounding box, but this user input is provided prior to segmentation occurring. In this embodiment, the segmentation $S_1$ is the segmentation after placement of a plurality of user inputs (e.g. all the user's brushes) and this segmentation may, for example, be obtained using the method shown in FIG. 6 and described above. In this embodiment, the sets b− and b+ comprise image elements which have been identified by any of the background or foreground inputs in the plurality of user inputs respectively.

In another embodiment of the method shown in FIG. 7, the segmentation $S_0$ is the segmentation after some user inputs (e.g. after one or more iterations of the method shown in FIG. 4 or 6) and the segmentation $S_1$ is the segmentation after placement of one or more subsequent user inputs (e.g. after one or more further iterations of the method shown in FIG. 4 or 6). In this embodiment, the sets b− and b+ are defined based only on the subsequent user inputs and any inputs placed previously (i.e. before segmentation $S_0$ is computed) are not considered.

Having updated the segmentation, in block 708 or 710, the updated segmentation results may be displayed to the user via a display device (not shown in FIG. 7), e.g. the foreground or the background portions may be displayed to the user or the two portions may be displayed as different layers within an image editing application or tool. In some embodiments, the segmentation $S_1$ may not be displayed to the user until after the post processing shown in FIG. 7 is performed.

Where the method of FIG. 7 is run multiple times, such as after each user input (e.g. after each user brush stroke) or after each group of user inputs, in the first iteration, segmentation $S_0$ will be the initial segmentation and $S_1$ will be the updated segmentation based on the first user input (or first group of user inputs). Subsequently, however, $S_0$ will be the same as $S_1$ from the previous iteration and $S_1$ will be the newly updated segmentation after an additional user input or group of user inputs. In such an example, the results of the updated segmentation may be displayed to the user after each iteration, or alternatively the results may only be displayed after the final iteration.

As described above, the groups of user inputs (e.g. brush strokes) may be defined according to the order in which the input is received (e.g. 1$^{st}$ 5 brush strokes, next 5 brush strokes etc) or the groups may be defined in another manner (e.g. first group of connected brush strokes, second group of connected brush strokes etc). In such an embodiment, the method of image segmentation may be as shown in the flow diagram in FIG. 9.

According to the method shown in FIG. 9, a plurality of user inputs are received (block 904) following an initial segmentation (performed in block 902, e.g. using the method shown in FIG. 2). The plurality of user inputs are grouped into a number of groups (block 906) and the segmentation is updated based on a first group (block 908 e.g. using the method shown in FIG. 6). The post-processing described above with reference to FIG. 7 can then be applied (block 910) with $S_0$ as the initial segmentation (from block 902) and $S_1$ as the updated segmentation (from block 908). This can then be repeated (as indicated by arrow 912) for each of the groups of user inputs, with, for each iteration, $S_0$ being the resultant segmentation from the previous iteration (following block 910 of the previous iteration) and $S_1$ as the updated segmentation based on the new group of user inputs (from block 908). The grouping of the user inputs (in block 906) may be performed by the analysis engine 105 in FIG. 1 and those brushes which are physically close together in the image may be grouped together. In other examples, different grouping strategies may be used (e.g. those brushes which have similar colors).

The results of each iteration of FIG. 9 may be displayed to a user via a display device (e.g. following block 910 in each iteration) or in another embodiment, the final segmentation only may be displayed (block 914), once the method has iterated through each group of user inputs. In other embodiments, the segmentation results may be used for another purpose and not displayed to the user or the results may be further processed before being displayed to the user.

The methods described above may be implemented in an image editing tool within a software application. In an embodiment, the software application is an image editing application. In another embodiment, the software application is not a dedicated image editing application, but may instead be a word processing application, a spreadsheet application, a slide presentation application, a database application, an email application etc. Where a number of software applications are combined within a multiple functionality application, the image editing tool may be available within each application and may be presented to the user in the same or a similar manner in each application within the multiple functionality application. In an example, a dedicated control 1002 for image segmentation may be provided within a ribbon-shaped user interface 1004 above the software application workspace 1006, as shown in the schematic diagram of FIG. 10.

When a user clicks (e.g. with a mouse or other pointing device, which may include a finger if the display device is touch sensitive) on the dedicated control 1002, having selected an image 1008 which is displayed in the software application workspace 1006, the image 1008 may be segmented (e.g. using the method shown in FIG. 2) and further controls 1010, 1012 may be displayed to enable a user to provide further inputs to refine the initial segmentation. On receipt of a further user input, one or more of the methods described herein may performed, e.g. the method shown in FIG. 4 or FIG. 6, which may, in some embodiments, be followed by the method shown in FIG. 7. The image 1008 may, for example, have been pasted into a word processing document, a spreadsheet, an email, a database or a slide presentation.

Figure 11:
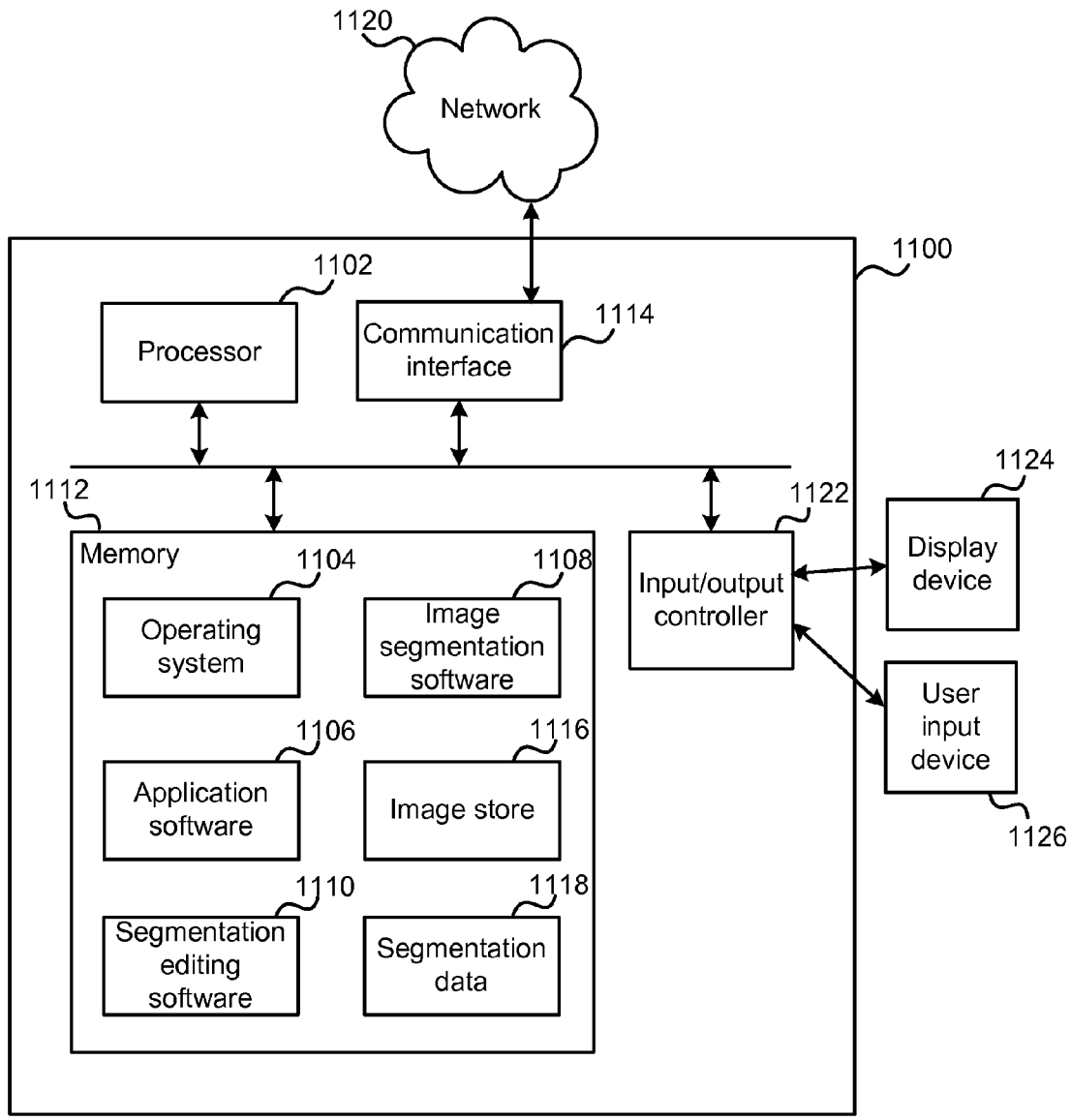
FIG. 11 illustrates an exemplary computing-based device in which embodiments of the methods described herein may be implemented.

FIG. 11 illustrates various components of an exemplary computing-based device 1100 which may be implemented as any form of a computing and/or electronic device, and in which embodiments of the methods described herein may be implemented.

Computing-based device 1100 comprises one or more processors 1102 which may be microprocessors, controllers or any other suitable type of processors for processing computing executable instructions to control the operation of the device in order to perform image segmentation, as described herein. Platform software comprising an operating system 1104 or any other suitable platform software may be provided at the computing-based device to enable application software 1106 to be executed on the device.

The application software 1106 may include software (i.e. executable instructions) for performing image segmentation or separate software 1108 may be provided. Where separate software is provided, this may be called by the application software 1106 or may be called directly by the user (e.g. as an image segmentation application). The image segmentation software may comprise software for performing the methods of updating the segmentation as described herein or separate software 1110 may be provided.

The computer executable instructions may be provided using any computer-readable media, such as memory 1112. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 1100 it will be appreciated that the storage may be distributed or located remotely and accessed via a network or other communication link (e.g. using communication interface 1114).

The memory 1112 may comprise an image store 1116 for storing the images which are segmented and may also comprise a store for segmentation data 1118.

The communication interface 1114 is arranged to send/receive information over a network 1120. Any suitable network technology (including wired and wireless technologies) and network protocol(s) may be used.

The computing-based device 1100 also comprises an input/output controller 1122 arranged to output display information to a display device 1124 which may be separate from or integral to the computing-based device 1100. The display information may provide a graphical user interface and may be arranged to display the results of the updated image segmentation (as generated using any of the methods described herein) to the user. The input/output controller 1122 is also arranged to receive and process input from one or more devices, such as a user input device 1126 (e.g. a mouse or a keyboard). This user input may be the user input which is used to update the segmentation using one of the methods described herein (e.g. user input 102 in FIG. 1, or as received in block 402 in FIG. 4, block 602 in FIG. 6, block 904 in FIG. 9 or as shown in FIGS. 3 and 8). In an embodiment the display device 1124 may also act as the user input device 1126 if it is a touch sensitive display device. The input/output controller 1122 may also output data to devices other than the display device, e.g. a locally connected printing device (not shown in FIG. 11).

Although the present examples are described and illustrated herein as being implemented in the system shown in FIG. 11, the system described is provided as an example and not a limitation. As those skilled in the art will appreciate, the present examples are suitable for application in a variety of different types of computing systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
   receiving, by a computer, at least one user input identifying a plurality of image elements in a segmented image as belonging to a first portion of the image, the segmented image comprising the first portion comprising image elements having a first label and a second portion comprising image elements having a second label;

updating properties associated with the first portion of the image giving more weight to the identified plurality of image elements than to other image elements in the first portion; and updating the first and second portions of the segmented image based on the updated properties;

wherein, the properties associated with the first portion of the image comprise a Gaussian mixture model and updating properties associated with the first portion of the image giving more weight to the identified plurality of image elements than to other image elements in the first portion comprises:

updating parameters of the Gaussian mixture model using a weighted average of a Gaussian mixture model component for each image element in the plurality of image elements and for each of the other image elements in the first portion, wherein a first weight is applied to the component for each image element in the plurality of image elements, a second weight is applied to the component for each of the other image elements in the first portion and the first weight is larger than the second weight; or the method further comprises:

computing a plurality of regions in the image, each region comprising connected image elements having the second label before updating the first and second portions and having the first label after updating the first and second portions; and further updating the first and second portions of the segmented image by determining if a region comprises one of the plurality of identified image elements and if the region does not comprise one of the plurality of identified image elements, changing the label of each image element in the region from the first label to the second label.

2. A method according to claim 1, wherein updating properties associated with the first portion of the image giving more weight to the identified plurality of image elements than to other image elements in the first portion comprises:

defining a first set of image elements comprising the identified plurality of image elements;

defining a second set of image elements comprising image elements having the first label excluding any elements in the identified plurality of image elements; and updating properties associated with the first portion of the image based on a weighted combination of properties of image elements in the first portion, using a first weight in relation to the first set of image elements and a second weight in relation to the second set of image elements and wherein the first weight is larger than the second weight.

3. A method according to claim 1, wherein the properties associated with the first portion of the image comprises a Gaussian mixture model and wherein updating properties associated with the first portion of the image giving more weight to the identified plurality of image elements than to other image elements in the first portion comprises:

updating parameters of the Gaussian mixture model using a weighted average of a Gaussian mixture model component for each image element in the plurality of image elements and for each of the other image elements in the first portion, wherein a first weight is applied to the component for each image elements, a second weight is applied to the component for each of the other image elements in the first portion and the first weight is larger than the second weight.

4. A method according to claim 1, further comprising, prior to updating the first and second portions of the segmented image:

receiving, by the computer, at least one user input identifying a second plurality of image elements in the segmented image as belonging to the second portion of the image; and updating properties associated with the second portion of the image giving more weight to the second identified plurality of image elements than to other image elements in the second portion.

5. A method according to claim 1, further comprising:

receiving, by a computer, a further user input identifying a further plurality of image elements in a segmented image as belonging to one of the portions of the segmented image;

further updating properties associated with said one of the portions of the segmented image giving more weight to the identified further plurality of image elements than to other image elements in said one of the portions; and further updating the first and second portions of the segmented image based on the further updated properties.

6. A method according to claim 5, further comprising repeating the further updating steps on receipt of each additional further user input.

7. A method according to claim 1, wherein receiving at least one user input comprises receiving a plurality of user inputs and wherein the method further comprises:

dividing the plurality of user inputs into groups of user inputs, wherein each group of user inputs identifies a plurality of image elements in the segmented image as belonging to a first portion of the image, and wherein the updating steps are performed separately for each group of user inputs.

8. A method according to claim 1, wherein the first portion comprises a foreground portion and the second portion comprises a background portion.

9. A method according to claim 1, wherein the updating of the first and second portions of the segmented image are performed by optimization of an energy function.

10. A method according to claim 1, wherein the user input comprises a user-defined brush stroke.

11. A method according to claim 1, further comprising:

displaying, on a display device, at least one of the updated first and second portions of the segmented image.

12. A method according to claim 1, further comprising:

computing a plurality of regions in the image, each region comprising connected image elements having the second label before updating the first and second portions and having the first label after updating the first and second portions; and further updating the first and second portions of the segmented image by determining if a region comprises one of the plurality of identified image elements and if the region does not comprise one of the plurality of identified image elements, changing the label of each image element in the region from the first label to the second label.

13. A computer-implemented method of updating a segmented image based on at least one user input, the segmented image comprising a foreground portion and a background portion and the method comprising:

displaying at least the foreground portion of the segmented image to a user;

receiving at least one user input identifying a plurality of image elements in the segmented image as assigned to a first portion selected from the background and foreground portions of the segmented image;

updating properties of said first portion using a weighted combination of properties of each image element in the first portion, wherein a first weight is used for properties of the identified plurality of image elements and a second weight is used for properties of other image elements in said first portion and wherein the first weight is bigger than the second weight;

updating the foreground and background portions of the segmented image based on the updated properties;

computing a plurality of regions in the image, each region comprising connected image elements assigned to said first portion after updating and assigned to a second portion before updating, wherein the second portion is also selected from the background and foreground portions and is not the same as the first portion;

further updating the foreground and background portions of the segmented image by, for each of the plurality of regions in the image, assigning each image element in the region to the second portion if the region does not comprise one of the plurality of identified image elements; and displaying at least the further updated foreground portion of the segmented image to the user.

14. A method according to claim 13, further comprising, prior to updating the foreground and background portions of the segmented image based on the updated properties:

receiving at least one user input identifying a second plurality of image elements in the segmented image as assigned to the second portion;

updating properties of said second portion using a weighted combination of properties of each image element in the second portion, wherein the first weight is used for properties of the identified second plurality of image elements and the second weight is used for properties of other image elements in said second portion.

15. A method according to claim 13, implemented in an image editing tool in a software application.

16. A system for updating a segmented image based on at least one user input, the segmented image comprising a foreground portion and a background portion and the system comprising:

one or more processors configured to:

cause display of at least the foreground portion of the segmented image to a user;

receive at least one user input identifying a plurality of image elements in the segmented image as assigned to a first portion selected from the background and foreground portions of the segmented image;

update properties of said first portion using a weighted combination of properties of each image element in the first portion, wherein a first weight is used for properties of the identified plurality of image elements and a second weight is used for properties of other image elements in said first portion and wherein the first weight is bigger than the second weight;

update the foreground and background portions of the segmented image based on the updated properties;

compute a plurality of regions in the image, each region comprising connected image elements assigned to said first portion after updating and assigned to a second portion before updating, wherein the second portion is also selected from the background and foreground portions and is not the same as the first portion;

further update the foreground and background portions of the segmented image by, for each of the plurality of regions in the image, assigning each image element in the region to the second portion if the region does not comprise one of the plurality of identified image elements; and cause display of at least the further updated foreground portion of the segmented image to the user.

17. A system according to claim 16, the one or more processors being further configured to, prior to updating the foreground and background portions of the segmented image based on the updated properties:

receive at least one user input identifying a second plurality of image elements in the segmented image as assigned to the second portion;

update properties of said second portion using a weighted combination of properties of each image element in the second portion, wherein the first weight is used for properties of the identified second plurality of image elements and the second weight is used for properties of other image elements in said second portion.

18. A system according to claim 16, the one or more processors being further configured to provide an image editing tool in a software application.

19. A system according to claim 16, wherein the at least one user input includes a user-defined brush stroke.

20. A System according to claim 16, the one or more processors being further configured to repeat the further update on receipt of one or more additional further user inputs.

* * * * *